US012675983B2

(12) United States Patent (10) Patent No.: US 12,675,983 B2
Roy et al. (45) Date of Patent: Jul. 7, 2026

(54) SYSTEMS AND METHODS FOR SEMANTIC IMAGE SEGMENTATION MODEL LEARNING NEW OBJECT CLASSES

(71) Applicant: NAVER CORPORATION, Gyeonggi-do (KR)

(72) Inventors: Subhankar Roy, Kolkata (IN); Riccardo Volpi, Grenoble (FR); Diane Larlus, La Tronche (FR); Gabriela Csurka Khedari, Crolles (FR)

(73) Assignee: NAVER CORPORATION, Gyeonggi-Do (KR)

( * ) Notice: Subject to any disclaimer, the term of this patent is extended or adjusted under 35 U.S.C. 154(b) by 536 days.

(21) Appl. No.: 18/103,119

(22) Filed: Jan. 30, 2023

(65) Prior Publication Data

US 2024/0257504 A1 Aug. 1, 2024

(51) Int. Cl.
*G06V 10/774* (2022.01)
*G05D 1/00* (2024.01)
*G06V 10/26* (2022.01)
*G06V 10/74* (2022.01)
*G06V 10/764* (2022.01)
(Continued)

(52) U.S. Cl.
CPC ....... *G06V 10/7753* (2022.01); *G05D 1/0246* (2013.01); *G06V 10/26* (2022.01); *G06V 10/761* (2022.01); *G06V 10/764* (2022.01); *G06V 20/70* (2022.01); *G06V 10/776* (2022.01)

(58) Field of Classification Search
CPC .. G06V 10/7753; G06V 10/26; G06V 10/761; G06V 10/764; G06V 20/70; G06V 10/776; G06V 10/82; G06V 20/10; G05D 1/0246; G06F 18/214; G06T 7/11; G06T 7/10; Y02T 10/40

USPC .......................................................... 382/159
See application file for complete search history.

(56) References Cited

U.S. PATENT DOCUMENTS 11,809,523 B2 * 11/2023 Kastaniotis et al. ........................
                                                    G06F 18/2155
12,286,115 B2 * 4/2025 Pham et al. .... B60W 30/18154
                                                    (Continued)

FOREIGN PATENT DOCUMENTS

CN          117009560 A * 11/2023 ........... G06F 16/532

OTHER PUBLICATIONS

"Incremental Learning Techniques for Semantic Segmentation", by Michieli et al., published in 2019 in 2019 IEEE/CVF International Conference on Computer Vision Workshop (ICCVW) (Year: 2019).*
(Continued)

*Primary Examiner* — Matthew C Bella
*Assistant Examiner* — Daniel J. Santos

(57) ABSTRACT

A semantic image segmentation (SIS) system includes: a semantic segmentation module trained to segment objects belonging to predetermined classes in input images using training images; and a learning module configured to selectively update at least one parameter of each of a localizer module, an encoder module, and a decoder module of the semantic segmentation module to identify objects having a new class that is not one of the predetermined classes: based on an image level class for a learning image including an object having the new class that is not one of the predetermined classes; and without a pixel-level annotation for the learning image.

22 Claims, 8 Drawing Sheets
(3 of 8 Drawing Sheet(s) Filed in Color)

(51) Int. Cl.
 *G06V 10/776* (2022.01)
 *G06V 20/70* (2022.01)

(56) References Cited

U.S. PATENT DOCUMENTS

2017/0330059 A1\* 11/2017 Novotny et al. ......... G06K 9/66
2022/0076117 A1\* 3/2022 Amon et al. ............. G60N 3/08

OTHER PUBLICATIONS

"Incremental Learning in Semantic Segmentation from Image Labels", by Cermelli et al., published in Jun. 2022 in 2022 IEEE/CVF Conference on Computer Vision and Pattern Recognition (CVPR), New Orleans, LA, USA, 2022, pp. 4361-4371 (Year: 2022).\*
Ahn, Jiwoon, and Suha Kwak. "Learning Pixel-Level Semantic Affinity with Image-Level Supervision for Weakly Supervised Semantic Segmentation." In *Conference on Computer Vision and Pattern Recognition*, 2018.
Araslanov, Nikita, and Stefan Roth. "Single-Stage Semantic Segmentation From Image Labels." In *2020 Conference on Computer Vision and Pattern Recognition (CVPR)*, 2020.
Baek, Donghyeon, Youngmin Oh, and Bumsub Ham. "Exploiting a Joint Embedding Space for Generalized Zero-Shot Semantic Segmentation." In *International Conference on Computer Vision (ICCV)*, 2021.
Bearman, Amy, Olga Russakovsky, Vittorio Ferrari, and Li Fei-Fei. "What's the Point: Semantic Segmentation with Point Supervision." In *Computer Vision—ECCV 2016*, edited by Bastian Leibe, Jiri Matas, Nicu Sebe, and Max Welling, 9911:549-65. Lecture Notes in Computer Science. Cham: Springer International Publishing, 2016.
Borenstein, Eran, and Shimon Ullman. "Learning to Segment." In *Computer Vision—ECCV 2004*, edited by Tomáš Pajdla and Jiří Matas, 3023:315-28. Lecture Notes in Computer Science. Berlin, Heidelberg: Springer Berlin Heidelberg, 2004.
Bucher, Maxime, Tuan-Hung Vu, Matthieu Cord, and Patrick Pérez. "Zero-Shot Semantic Segmentation," NeurIPS, 2019.
Cermelli, Fabio. "Prototype-Based Incremental Few-Shot Semantic Segmentation," BMVC, 2021.
Cermelli, Fabio, Dario Fontanel, Antonio Tavera, Marco Ciccone, and Barbara Caputo. "Incremental Learning in Semantic Segmentation from Image Labels." In *Conference on Computer Vision and Pattern Recognition (CVPR)*, 2022.
Cermelli, Fabio, Massimiliano Mancini, Samuel Rota Bulo, Elisa Ricci, and Barbara Caputo. "Modeling the Background for Incremental Learning in Semantic Segmentation." In *Conference on Computer Vision and Pattern Recognition (CVPR)*, 2020.
Cha, Sungmin, Beomyoung Kim, YoungJoon Yoo, and Taesup Moon. "SSUL: Semantic Segmentation with Unknown Label for Exemplar-Based Class-Incremental Learning," NeurIPS 2021.
Cordts, Marius, Mohamed Omran, Sebastian Ramos, Timo Rehfeld, Markus Enzweiler, Rodrigo Benenson, Uwe Franke, Stefan Roth, and Bernt Schiele. "The Cityscapes Dataset for Semantic Urban Scene Understanding." In *Conference on Computer Vision and Pattern Recognition (CVPR)*, 2016.
Dai, Jifeng, Kaiming He, and Jian Sun. "BoxSup: Exploiting Bounding Boxes to Supervise Convolutional Networks for Semantic Segmentation." In *International Conference on Computer Vision (ICCV)*, 2015.
Devlin, Jacob, Ming-Wei Chang, Kenton Lee, and Kristina Toutanova. "BERT: Pre-Training of Deep Bidirectional Transformers for Language Understanding," Proceedings of NAACL-HLT, 2019.
Ding, Henghui, Chang Liu, Suchen Wang, and Xudong Jiang. "Vision-Language Transformer and Query Generation for Referring Segmentation." In *International Conference on Computer Vision (ICCV)*, 2021.
Douillard, Arthur, Yifu Chen, Arnaud Dapogny, and Matthieu Cord. "PLOP: Learning without Forgetting for Continual Semantic Segmentation." In *Conference on Computer Vision and Pattern Recognition (CVPR)*, 2021.

Gidaris, Spyros, and Nikos Komodakis. "Dynamic Few-Shot Visual Learning Without Forgetting." In *Conference on Computer Vision and Pattern Recognition*, 2018.
Gomez, Lluis, Yash Patel, Marcal Rusinol, Dimosthenis Karatzas, and C. V. Jawahar. "Self-Supervised Learning of Visual Features through Embedding Images into Text Topic Spaces." In *Conference on Computer Vision and Pattern Recognition (CVPR)*, 2017.
He, Kaiming, Xiangyu Zhang, Shaoqing Ren, and Jian Sun. "Deep Residual Learning for Image Recognition." In *Conference on Computer Vision and Pattern Recognition (CVPR)*, 2016.
Hu, Ronghang, Marcus Rohrbach, and Trevor Darrell. "Segmentation from Natural Language Expressions." arXiv, Mar. 20, 2016.
Huang, Zilong, Xinggang Wang, Jiasi Wang, Wenyu Liu, and Jingdong Wang. "Weakly-Supervised Semantic Segmentation Network with Deep Seeded Region Growing." In *Conference on Computer Vision and Pattern Recognition*, 2018.
Ioffe, Sergey. "Batch Renormalization: Towards Reducing Minibatch Dependence in Batch-Normalized Models," NIPS, 2017.
Ji, Zongliang. "Weakly Supervised Semantic Segmentation: From Box to Tag and Back," BMVC, 2021.
Jia, Chao, Yinfei Yang, Ye Xia, Yi-Ting Chen, Zarana Parekh, Hieu Pham, Quoc V Le, Yunhsuan Sung, Zhen Li, and Tom Duerig. "Scaling Up Visual and Vision-Language Representation Learning With Noisy Text Supervision," ICML 2021.
Kolesnikov, Alexander, and Christoph H. Lampert. "Seed, Expand and Constrain: Three Principles for Weakly-Supervised Image Segmentation." In *Computer Vision—ECCV 2016*.
Kulharia, Viveka, Siddhartha Chandra, Amit Agrawal, Philip Torr, and Ambrish Tyagi. "Box2Seg: Attention Weighted Loss and Discriminative Feature Learning for Weakly Supervised Segmentation." In *Computer Vision—ECCV 2020*.
Li, Boyi, Vladlen Koltun, Kilian Q Weinberger, René Ranftl, and Serge Belongie. "Language-Driven Semantic Segmentation," ICLR, 2022.
Li, Peike, Yunchao Wei, and Yi Yang. "Consistent Structural Relation Learning for Zero-Shot Segmentation," NeurIPS 2020.
Li, Zhizhong, and Derek Hoiem. "Learning without Forgetting." arXiv.
Lin, Di, Jifeng Dai, Jiaya Jia, Kaiming He, and Jian Sun. "ScribbleSup: Scribble-Supervised Convolutional Networks for Semantic Segmentation." In *Conference on Computer Vision and Pattern Recognition (CVPR)*, 2016.
Lin, Tsung-Yi, Maire, Michael, Belongie, Serge, Hays, James, Perona, Pietro, Ramanan, Deva, Dollar, Piotr, and Zitnick, C. Lawrence. "Microsoft COCO: Common Objects in Context." arXiv:1405.0312. Feb. 21, 2015.
Liu, Chenxi, Zhe Lin, Xiaohui Shen, Jimei Yang, Xin Lu, and Alan Yuille. "Recurrent Multimodal Interaction for Referring Image Segmentation." In *International Conference on Computer Vision (ICCV)*, 2017.
Maracani, Andrea, Umberto Michieli, Marco Toldo, and Pietro Zanuttigh. "RECALL: Replay-Based Continual Learning in Semantic Segmentation." In *International Conference on Computer Vision (ICCV)*, 2021.
Michieli, Umberto, and Pietro Zanuttigh. "Continual Semantic Segmentation via Repulsion-Attraction of Sparse and Disentangled Latent Representations." *CVPR*, 2021.
Michieli, Umberto, and Pietro Zanuttigh. "Incremental Learning Techniques for Semantic Segmentation." In *International Conference on Computer Vision Workshop (ICCVW)*, 2019.
Michieli, Umberto, and Pietro Zanuttigh. "Knowledge Distillation for Incremental Learning in Semantic Segmentation." arXiv, Jan. 20, 2021.
Mikolov, Tomas, Kai Chen, Greg Corrado, and Jeffrey Dean. "Efficient Estimation of Word Representations in Vector Space." arXiv, Sep. 6, 2013.
Parisi, German I., Ronald Kemker, Jose L. Part, Christopher Kanan, and Stefan Wermter. "Continual Lifelong Learning with Neural Networks: A Review." arXiv, 2019.
Pennington, Jeffrey, Richard Socher, and Christopher Manning. "Glove: Global Vectors for Word Representation." In *Proceedings of the 2014 Conference on Empirical Methods in Natural Language Processing (EMNLP)*, 2014.

(56) References Cited

OTHER PUBLICATIONS

Qi, Hang, Matthew Brown, and David G. Lowe. "Low-Shot Learning with Imprinted Weights." In *Conference on Computer Vision and Pattern Recognition*, 2018.

Qian, Rui, Yunchao Wei, Honghui Shi, Jiachen Li, Jiaying Liu, and Thomas Huang. "Weakly Supervised Scene Parsing with Point-Based Distance Metric Learning." *Proceedings of the AAAI Conference on Artificial Intelligence*, 2019.

Roy, Anirban, and Sinisa Todorovic. "Combining Bottom-Up, Top-Down, and Smoothness Cues for Weakly Supervised Image Segmentation." *Conference on Computer Vision and Pattern Recognition (CVPR)*, 2017.

Sariyildiz, Mert Bulent, Julien Perez, and Diane Larlus. "Learning Visual Representations with Caption Annotations." In *Computer Vision—ECCV*, 2020.

Mert Bulent Sariyildiz, Yannis Kalantidis, Diane Larlus, and Karteek Alahari. Concept generalization in visual representation learning. In ICCV, 2021.

Shi, Miaojing, Holger Caesar, and Vittorio Ferrari. "Weakly Supervised Object Localization Using Things and Stuff Transfer." *International Conference on Computer Vision (ICCV)*, 2017.

Siam, Mennatullah, Boris Oreshkin, and Martin Jagersand. "AMP: Adaptive Masked Proxies for Few-Shot Segmentation." *International Conference on Computer Vision (ICCV)*, 2019.

Song, Chunfeng, Yan Huang, Wanli Ouyang, and Liang Wang. "Box-Driven Class-Wise Region Masking and Filling Rate Guided Loss for Weakly Supervised Semantic Segmentation." *Computer Vision and Pattern Recognition (CVPR)*, 2019.

Tang, Meng, Abdelaziz Djelouah, Federico Perazzi, Yuri Boykov, and Christopher Schroers. "Normalized Cut Loss for Weakly-Supervised CNN Segmentation." *Conference on Computer Vision and Pattern Recognition*, 2018.

Tian, Yonglong, Yue Wang, Dilip Krishnan, Joshua B. Tenenbaum, and Phillip Isola. "Rethinking Few-Shot Image Classification: A Good Embedding Is All You Need?" arXiv, Jun. 17, 2020.

WeiWang, VincentWZheng, Han Yu, and Chunyan Miao. A survey of zero-shot learning: Settings, methods, and applications. ACM Transactions on Intelligent Systems and Technology (TIST), 2019.

Yaqing Wang, Quanming Yao, James T Kwok, and Lionel M Ni. Generalizing from a few examples: A survey on few-shot learning. ACM computing surveys (csur), 2020.

Wang, Yude, Jie Zhang, Meina Kan, Shiguang Shan, and Xilin Chen. Self-Supervised Equivariant Attention Mechanism for Weakly Supervised Semantic Segmentation *Conference on Computer Vision and Pattern Recognition (CVPR)*, 2020.

Wang, Zhaoqing, Yu Lu, Qiang Li, Xunqiang Tao, Yandong Guo, Mingming Gong, and Tongliang Liu. "CRIS: CLIP-Driven Referring Image Segmentation." *Conference on Computer Vision and Pattern Recognition (CVPR)*, 2022.

Wu, Zifeng, Chunhua Shen, and Anton van den Hengel. "Wider or Deeper: Revisiting the ResNet Model for Visual Recognition." arXiv, Nov. 30, 2016.

Xian, Yongqin, Subhabrata Choudhury, Yang He, Bernt Schiele, and Zeynep Akata. "Semantic Projection Network for Zero- and Few-Label Semantic Segmentation." *Conference on Computer Vision and Pattern Recognition (CVPR)*, 2019.

Xie, Enze, Wenhai Wang, Zhiding Yu, Anima Anandkumar, Jose M Alvarez, and Ping Luo. "SegFormer: Simple and Ef?cient Design for Semantic Segmentation with Transformers," NeurIPS, 2021.

Xu, Jiarui, Shalini De Mello, Sifei Liu, Wonmin Byeon, Thomas Breuel, Jan Kautz, and Xiaolong Wang. "GroupViT: Semantic Segmentation Emerges from Text Supervision." In *Conference on Computer Vision and Pattern Recognition (CVPR)*, 2022.

Xu, Lian, Wanli Ouyang, Mohammed Bennamoun, Farid Boussaid, and Dan Xu. "Multi-Class Token Transformer for Weakly Supervised Semantic Segmentation." *Conference on Computer Vision and Pattern Recognition (CVPR)*, 2022.

Zhao, Hang, Xavier Puig, Bolei Zhou, Sanja Fidler, and Antonio Torralba. "Open Vocabulary Scene Parsing." *International Conference on Computer Vision (ICCV)*, 2017.

Zhou, Bolei, Aditya Khosla, Agata Lapedriza, Aude Oliva, and Antonio Torralba. "Learning Deep Features for Discriminative Localization." *Conference on Computer Vision and Pattern Recognition (CVPR)*, 2016.

Zhou, Bolei, Hang Zhao, Xavier Puig, Sanja Fidler, Adela Barriuso, and Antonio Torralba. "Scene Parsing through ADE20K Dataset." *Conference on Computer Vision and Pattern Recognition (CVPR)*, 2017.

Brown, Tom, Benjamin Mann, Nick Ryder, Melanie Subbiah, Jared D Kaplan, Prafulla Dhariwal, Arvind Neelakantan, Pranav Shyam, Girish Sastry, Amanda Askell, et al. Language models are few-shot learners. Advances in neural information processing systems, 2020.

Pietro Buzzega, Matteo Boschini, Angelo Porrello, Davide Abati, and Simone Calderara. Dark experience for general continual learning: a strong, simple baseline. Advances in neural information processing systems, 2020.

Liang-Chieh Chen, George Papandreou, Iasonas Kokkinos, Kevin Murphy, and Alan L Yuille. Deeplab: Semantic image segmentation with deep convolutional nets, atrous convolution, and fully connected crfs. IEEE transactions on pattern analysis and machine intelligence, 2017.

Ali Cheraghian, Shafin Rahman, Pengfei Fang, Soumava Kumar Roy, Lars Petersson, and Mehrtash Harandi. Semantic-aware knowledge distillation for fewshot class-incremental learning. In CVPR, 2021.

Csurka, Gabriela, Riccardo Volpi, and Boris Chidlovskii. "Semantic Image Segmentation: Two Decades of Research." *Foundations and Trends® in Computer Graphics and Vision* 14, No. 1-2 (2022): 1-162. 2022.

Jia Deng,Wei Dong, Richard Socher, Li-Jia Li, Kai Li, and Li Fei-Fei. Imagenet: A large-scale hierarchical image database. In CVPR, 2009.

Everingham, Mark, Luc Van Gool, Christopher K. I. Williams, John Winn, and Andrew Zisserman. "The Pascal Visual Object Classes (VOC) Challenge." *International Journal of Computer Vision* 88, No. 2, Jun. 2010.

Ghiasi, Golnaz, Xiuye Gu, Yin Cui, and Tsung-Yi Lin. "Scaling Open-Vocabulary Image Segmentation with Image-Level Labels." In *Computer Vision—ECCV 2022*, edited by Shai Avidan, Gabriel Brostow, Moustapha Cissé, Giovanni Maria Farinella, and Tal Hassner, 13696:540-57. Lecture Notes in Computer Science. Cham: Springer Nature Switzerland, 2022.

Albert Gordo and Diane Larlus. Beyond instance-level image retrieval: Leveraging captions to learn a global visual representation for semantic retrieval. In CVPR, 2017.

Tyler L. Hayes, Nathan D. Cahill, and Christopher Kanan. Memory Efficient Experience Replay for Streaming Learning. In ICRA, 2019.

Anna Khoreva, Rodrigo Benenson, Jan Hosang, Matthias Hein, and Bernt Schiele. Simple does it: Weakly supervised instance and semantic segmentation. In CVPR, 2017.

Marvin Klingner, Andreas Bar, Philipp Donn, and Tim Fingscheidt. Class incremental learning for semantic segmentation re-using neither old data nor old labels. In 2020 IEEE 23rd International Conference on Intelligent Transportation Systems (ITSC), pp. 1-8. IEEE, 2020.

Jungbeom Lee, Eunji Kim, Sungmin Lee, Jangho Lee, and Sungroh Yoon. Ficklenet: Weakly and semi-supervised semantic image segmentation using stochastic inference. In CVPR, pp. 5267-5276, 2019.

Lee, Seungho, Minhyun Lee, Jongwuk Lee, and Hyunjung Shim. "Railroad Is Not a Train: Saliency as Pseudo-Pixel Supervision for Weakly Supervised Semantic Segmentation." arXiv, May 19, 2021.

David Lopez-Paz and Marc'Aurelio Ranzato. Gradient Episodic Memory for Continual Learning. In NeurIPS, 2017.

Masana, Marc, Xialei Liu, Bartlomiej Twardowski, Mikel Menta, Andrew D. Bagdanov, and Joost van de Weijer. "Class-Incremental Learning: Survey and Performance Evaluation on Image Classification." arXiv, 2021.

Michael McCloskey and Neal J Cohen. Catastrophic interference in connectionist networks: The sequential learning problem. In Psychology of learning and motivation. 1989.

(56)              References Cited

OTHER PUBLICATIONS

George A Miller. Wordnet: a lexical database for English. Communications of the ACM, 1995.

Quattoni, Ariadna, Michael Collins, and Trevor Darrell. "Learning Visual Representations Using Images with Captions." In *Conference on Computer Vision and Pattern Recognition*, 2007.

Radford, Alec, Jong Wook Kim, Chris Hallacy, Aditya Ramesh, Gabriel Goh, Sandhini Agarwal, Girish Sastry, et al. "Learning Transferable Visual Models From Natural Language Supervision," ICML, 2021.

Sylvestre-Alvise Rebuffi, Alexander Kolesnikov, Georg Sperl, and Christoph H. Lampert. iCaRL: Incremental Classifier and Representation Learning. In CVPR, 2017.

Guolei Sun, Wenguan Wang, Jifeng Dai, and Luc Van Gool. Mining cross-image semantics for weakly supervised semantic segmentation. In ECCV, 2020.

Yue Wu, Yinpeng Chen, Lijuan Wang, Yuancheng Ye, Zicheng Liu, Yandong Guo, and Yun Fu. Large scale incremental learning. In Proceedings of the IEEE/CVF Conference on Computer Vision and Pattern Recognition, pp. 374-382, 2019.

* cited by examiner

SYSTEMS AND METHODS FOR SEMANTIC IMAGE SEGMENTATION MODEL LEARNING NEW OBJECT CLASSES

FIELD

The present disclosure relates to semantic image segmentation models and more particularly to systems and methods for training semantic image segmentation models to be able to learn to segment objects from new classes in images without training based on samples containing annotations for such new classes.

BACKGROUND

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Navigating robots are one type of robot and are an example of an autonomous system that is mobile and may be trained to navigate environments without colliding with objects during travel. Navigating robots may be trained in the environment in which they will operate or trained to operate regardless of environment.

Navigating robots may be used in various different industries. One example of a navigating robot is a package handler robot that navigates an indoor space (e.g., a warehouse) to move one or more packages to a destination location. Another example of a navigating robot is an autonomous vehicle that navigates an outdoor space (e.g., roadways) to move one or more occupants/humans from a pickup to a destination. Another example of a navigating robot is a robot used to perform one or more functions inside a residential space (e.g., a home).

Other types of robots are also available, such as residential robots configured to perform various domestic tasks, such as putting liquid in a cup, filling a coffee machine, etc.

SUMMARY

In a feature, a semantic image segmentation (SIS) system includes: a semantic segmentation module trained to segment objects belonging to predetermined classes in input images using training images; and a learning module configured to selectively update at least one parameter of each of a localizer module, an encoder module, and a decoder module of the semantic segmentation module to identify objects having a new class that is not one of the predetermined classes: based on an image level class for a learning image including an object having the new class that is not one of the predetermined classes; and without a pixel-level annotation for the learning image.

In further features: a semantic map module is configured to generate semantic similarity maps based on semantic similarity between the new class and the predetermined classes, respectively, where the learning module is configured to selectively update at least one parameter of the localizer module of the semantic segmentation module based on the semantic similarity maps.

In further features a semantic loss module is configured to determine a loss based on the semantic similarity maps, where the learning module is configured to selectively update at least one parameter of the localizer module of the semantic segmentation module based on the loss.

In further features, the learning module is configured to selectively update at least one parameter of the localizer module of the semantic segmentation module based on minimizing the loss.

In further features: a semantic map module is configured to compute semantic similarity measures between the new class and the predetermined classes, respectively, where the learning module is configured to selectively update at least one parameter of the localizer module of the semantic segmentation module based on at least one of the computed semantic similarity measures.

In further features, the semantic segmentation module is trained to segment objects belonging to the predetermined classes in input images using training images and pixel-level annotations for training images including objects having the predetermined classes, the pixel-level annotations including pixels defining boundaries of the objects in the training images.

In further features, the learning module is configured to update a classifier layer of the decoder module of the semantic segmentation module.

In further features, a segmentation loss module is configured to determine a loss, where the learning module is configured to selectively update the at least one parameter of at least one of (a) the encoder module of the semantic segmentation module, (b) the decoder module of the semantic segmentation module, and (c) the localizer module based on the loss.

In further features, the learning module is configured to selectively update the at least one parameter of at least one of (a) the encoder module of the semantic segmentation module, (b) the decoder module of the semantic segmentation module, and (c) the localizer module based on minimizing the loss.

In further features, the one of the predetermined classes is a background class corresponding to background behind objects.

In a feature, a robot includes: a camera; the semantic segmentation module; and a control module configured to actuate an actuator of the robot based on an object segmented from an image from the camera by the semantic segmentation module.

In further features, the new class includes a word descriptive of the object in the learning image.

In further features, the learning module is further configured to selectively update at least one parameter of each of the localizer module, the encoder module, and the decoder module of the semantic segmentation module to identify objects having a second new class that is not the new class and not one of the predetermined classes: based on a second image level class for a second learning image including a second object having the second new class that is not one of the predetermined classes and not the new class; and without a pixel-level annotation for the second learning image.

In a feature, a semantic image segmentation (SIS) system includes: a semantic segmentation module including a semantic segmentation model that receives a first training using a first set of training images with pixel-level annotations labeled with one or more predetermined classes, the semantic segmentation module configured to segment objects in an input image using the semantic segmentation model into one or more of the predetermined classes; and a learning module configured to selectively update at least one parameter of the semantic segmentation model using a second set of training images with image-level annotations and without pixel-level annotations, the semantic segmentation model receiving a second training from the learning module to identify objects of a first new class that is not one of the predetermined classes using semantic similarity measures computed between labels identifying the first new class and labels identifying the predetermined classes, respectively, where the semantic segmentation module is configured to segment objects in the input image into one or more of the predetermined classes and the first new class once the segmentation model is second trained by the learning module for the first new class.

In further features: the learning module is configured to selectively update at least one parameter of the semantic segmentation model using a third set of training images with image-level annotations without pixel-level annotations; the semantic segmentation model receives a third training from the learning module to identify objects of a second new class that is not one of the predetermined classes or the first new class using semantic similarity measures computed between labels identifying the second new class and labels identifying the predetermined classes and the first new class, respectively; and the semantic segmentation module segments objects in the input image into one or more of the predetermined classes, the first new class, and the second new class once the segmentation model is trained by the learning module for the second new class.

In a feature, a semantic image segmentation (SIS) system includes: memory storing a semantic segmentation model trained using (a) a first set of training images with pixel-level annotations labeled for a first set of classes before being trained with (b) a second set of training images and image-level annotations without pixel-level annotations labeled with a first new class not in the first set of classes using semantic similarity measures computed between labels identifying the first new class and labels identifying the first set of classes, respectively; and a semantic segmentation module configured to, after the training, segment objects in an input image into the first set of classes and the first new class using the semantic segmentation model.

In a feature, a semantic image segmentation (SIS) method includes: obtaining a semantic segmentation module trained to segment objects belonging to predetermined classes in input images using training images; and selectively updating at least one parameter of each of a localizer module, an encoder module, and a decoder module of the semantic segmentation module to identify objects having a new class that is not one of the predetermined classes: based on an image level class for a learning image including an object having the new class that is not one of the predetermined classes; and without a pixel-level annotation for the learning image.

In further features, the SIS method further includes: generating semantic similarity maps based on semantic similarity between the new class and the predetermined classes, respectively, where the selectively updating includes selectively updating at least one parameter of the localizer module of the semantic segmentation module based on the semantic similarity maps.

In further features, the SIS method further includes determining a loss based on the semantic similarity maps, where the selectively updating includes selectively updating at least one parameter of the localizer module of the semantic segmentation module based on the loss.

In further features, the selectively updating includes selectively updating at least one parameter of the localizer module of the semantic segmentation module based on minimizing the loss.

In further features, the SIS method further includes: determining semantic similarity measures between the new class and the predetermined classes, respectively, where the selectively updating includes selectively updating at least one parameter of the localizer module of the semantic segmentation module based on at least one of the semantic similarity measures.

In further features, the semantic segmentation module is trained to segment objects belonging to the predetermined classes in input images using training images and pixel-level annotations for training images including objects having the predetermined classes, the pixel-level annotations including pixels defining boundaries of the objects in the training images.

In further features, the selectively updating includes updating a classifier layer of the decoder module of the semantic segmentation module.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present disclosure will become more fully understood from the detailed description and the accompanying drawings, wherein.

In the drawings, reference numbers may be reused to identify similar and/or identical elements.

DETAILED DESCRIPTION

A robot may include a camera. Images from the camera and measurements from other sensors of the robot can be used to control actuation of the robot, such as propulsion, actuation of one or more arms, and/or actuation of a gripper.

Some types of robots may determine a classification map for an object in an image using a semantic image segmentation (SIS) model. The SIS model is trained using images including annotation maps of objects of predetermined classes. For example, the SIS model may be trained to classify the pixels associated with cats in images using images including cats and the predetermined annotation map of cat.

The present application involves training the SIS model to be able to learn to segment objects in images leveraging the segmentation of other classes that the SIS model had learned in previous stages. In the example of the SIS model being trained to segment cats in images, the SIS model may be trained as described herein to be configured to identify and segment sheep in images without being trained based on images including sheep by training based on a semantic similarity between the class names of "sheep" and "cat". For example, a localizer module of the SIS model may be trained based also on minimizing a loss determined based on semantic similarity maps generated based on comparisons of the new class (name) word with the predetermined class (names), respectively. After this training, an encoder, a decoder, and the localizer module of the SIS model may be trained based on minimizing a segmentation loss determined based on pseudo-labels determined based on the semantic similarity maps. In this manner, the SIS model may learn to accurately and reliably segment objects of the new class in images.

Figure 1:
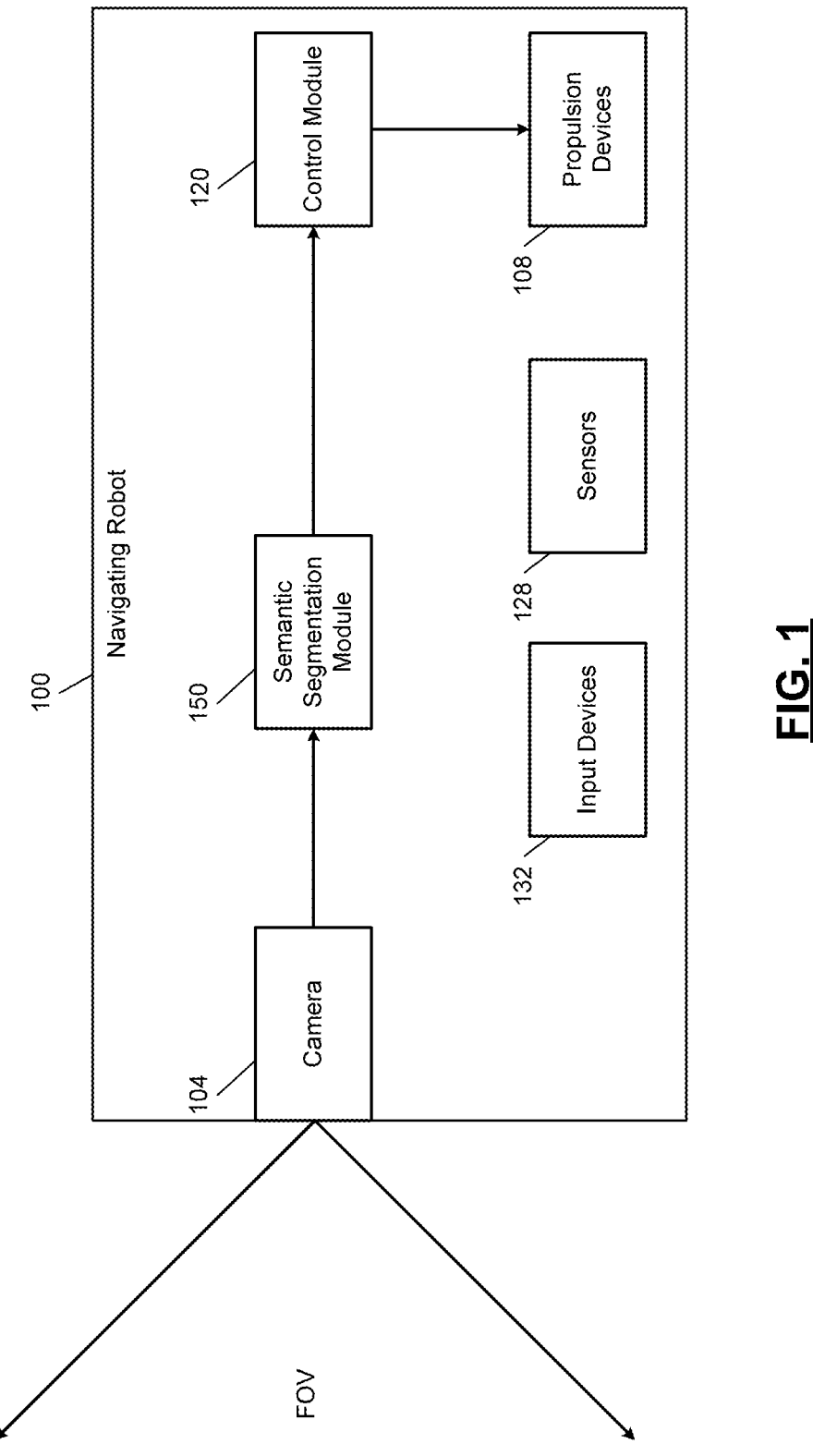
FIGS. 1 and 2 are functional block diagrams of example robots.

FIG. 1 is a functional block diagram of an example implementation of a navigating robot 100. The navigating robot 100 is a vehicle and is mobile. The navigating robot 100 includes a camera 104 that captures images within a predetermined field of view (FOV). The predetermined FOV may be less than or equal to 360 degrees around the navigating robot 100. The operating environment of the navigating robot 100 may be an indoor space (e.g., a building), an outdoor space, or both indoor and outdoor spaces.

The camera 104 may be, for example, a grayscale camera, a red, green, blue (RGB) camera, or another suitable type of camera. The camera 104 may or may not capture depth (D) information, such as in the example of a grayscale-D camera or a RGB-D camera. The camera 104 may be fixed to the navigating robot 100 such that the orientation of the camera 104 (and the FOV) relative to the navigating robot 100 remains constant. The camera 104 may update (capture images) at a predetermined frequency, such as 60 hertz (Hz), 120 Hz, or another suitable frequency.

A semantic segmentation module 150 segments objects in the images in the camera. Segmenting objects is different than object detection in that object detection involves identifying bounding boxes around the objects in images. Segmentation involves identifying and classifying the pixels that bound an object within an image.

The navigating robot 100 may include one or more propulsion devices 108, such as one or more wheels, one or more treads/tracks, one or more moving legs, one or more propellers, and/or one or more other types of devices configured to propel the navigating robot 100 forward, backward, right, left, up, and/or down. One or a combination of two or more of the propulsion devices 108 may be used to propel the navigating robot 100 forward or backward, to turn the navigating robot 100 right, to turn the navigating robot 100 left, and/or to elevate the navigating robot 100 vertically upwardly or downwardly. The robot 100 is powered, such as via an internal battery and/or via an external power source, such as wirelessly (e.g., inductively).

While the example of a navigating robot is provided, the present application is also applicable to other types of robots with a camera.

Figure 2:
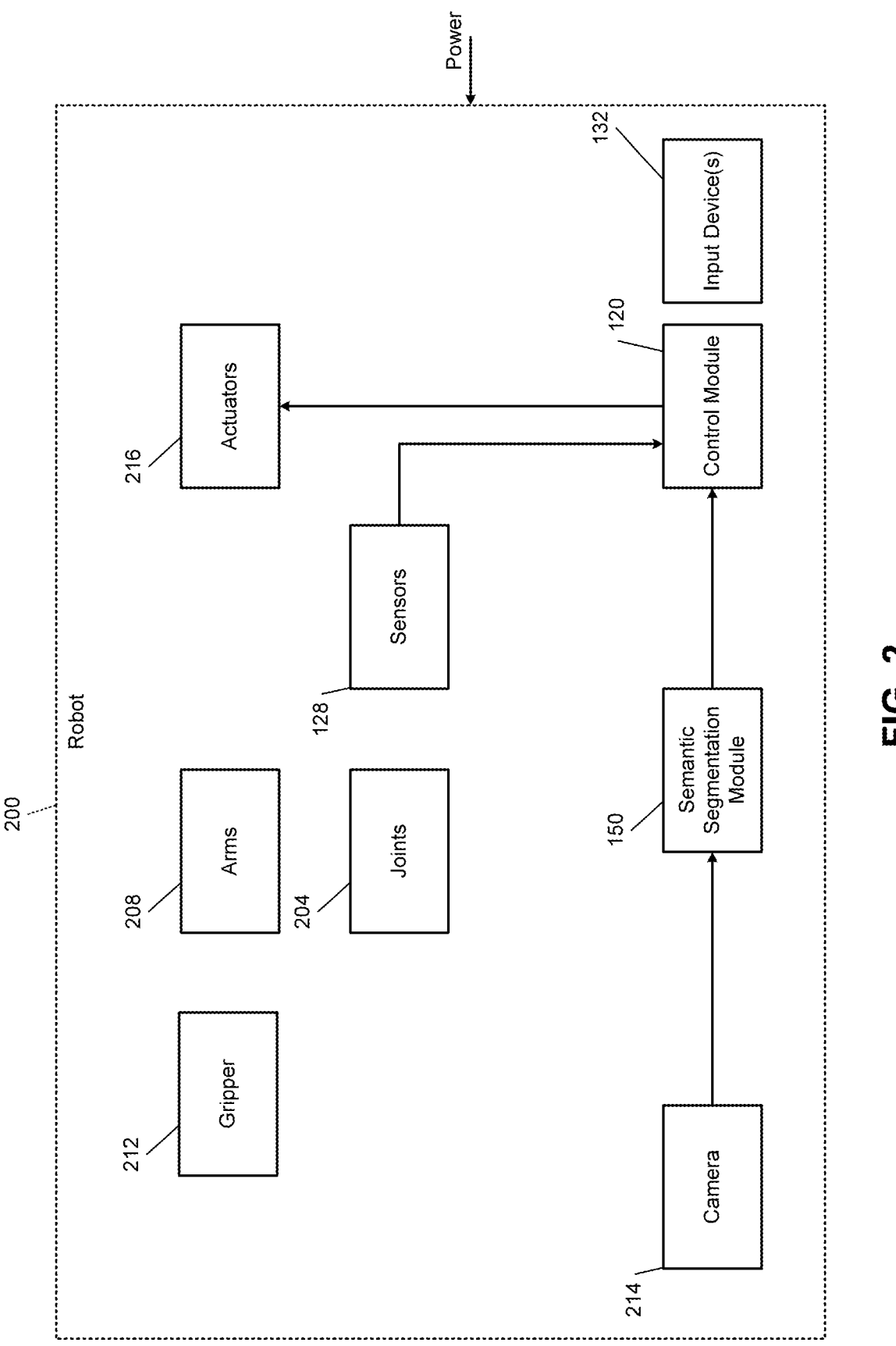

For example, FIG. 2 includes a functional block diagram of an example robot 200. The robot 200 may be stationary or mobile. The robot 200 may be, for example, a 5 degree of freedom (DoF) robot, a 6 DoF robot, a 7 DoF robot, an 8 DoF robot, or have another number of degrees of freedom. In various implementations, the robot 200 may include the Panda Robotic Arm by Franka Emika, the mini Cheetah robot, or another suitable type of robot.

The robot 200 is powered, such as via an internal battery and/or via an external power source, such as alternating current (AC) power. AC power may be received via an outlet, a direct connection, etc. In various implementations, the robot 200 may receive power wirelessly, such as inductively.

The robot 200 includes a plurality of joints 204 and arms 208. Each arm may be connected between two joints. Each joint may introduce a degree of freedom of movement of a (multi fingered) gripper 212 of the robot 200. The robot 200 includes actuators 216 that actuate the arms 208 and the gripper 212. The actuators 216 may include, for example, electric motors and other types of actuation devices.

In the example of FIG. 1, a control module 120 controls actuation of the propulsion devices 108. In the example of FIG. 2, the control module 120 controls the actuators 216 and therefore the actuation (movement, articulation, actuation of the gripper 212, etc.) of the robot 200. The control module 120 may include a planner module configured to plan movement of the robot 200 to perform one or more different tasks. An example of a task includes moving to and grasping and moving an object. The present application, however, is also applicable to other tasks, such as navigating from a first location to a second location while avoiding objects and other tasks. The control module 120 may, for example, control the application of power to the actuators 216 to control actuation and movement. Actuation of the actuators 216, actuation of the gripper 212, and actuation of the propulsion devices 108 will generally be referred to as actuation of the robot.

The robot 200 also includes a camera 214 that captures images within a predetermined field of view (FOV). The predetermined FOV may be less than or equal to 360 degrees around the robot 200. The operating environment of the robot 200 may be an indoor space (e.g., a building), an outdoor space, or both indoor and outdoor spaces.

The camera 214 may be, for example, a grayscale camera, a red, green, blue (RGB) camera, or another suitable type of camera. The camera 214 may or may not capture depth (D) information, such as in the example of a grayscale-D camera or a RGB-D camera. The camera 214 may be fixed to the robot 200 such that the orientation of the camera 214 (and the FOV) relative to the robot 200 remains constant. The camera 214 may update (capture images) at a predetermined frequency, such as 60 Hz (Hz), 120 Hz, or another suitable frequency.

The control module 120 controls actuation of the robot based on one or more images from the camera, such as the objects segmented in the images. The control module 120 may control actuation additionally or alternatively based on measurements from one or more sensors 128 and/or one or more input devices 132. Examples of sensors include position sensors, temperature sensors, location sensors, light sensors, rain sensors, force sensors, torque sensors, etc. Examples of input devices include touchscreen displays, joysticks, trackballs, pointer devices (e.g., mouse), keyboards, steering wheels, pedals, and/or one or more other suitable types of input devices.

Figure 3:
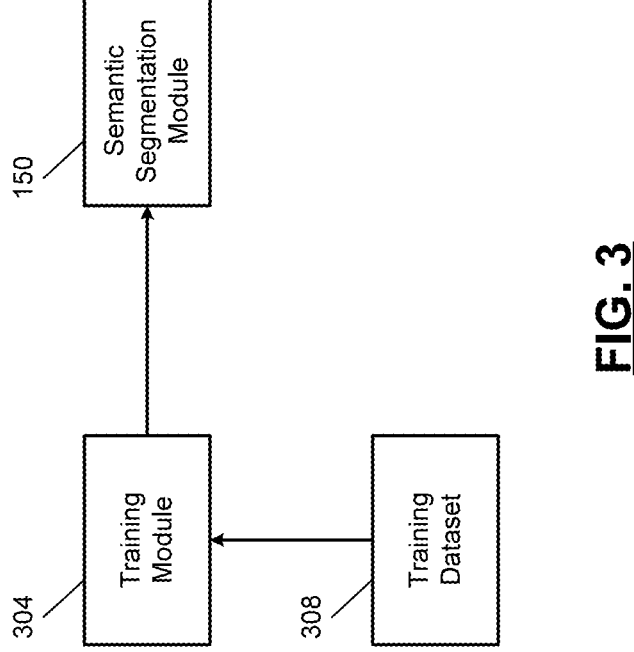
FIG. 3 includes a functional block diagram of an example training system.
Figure 4:
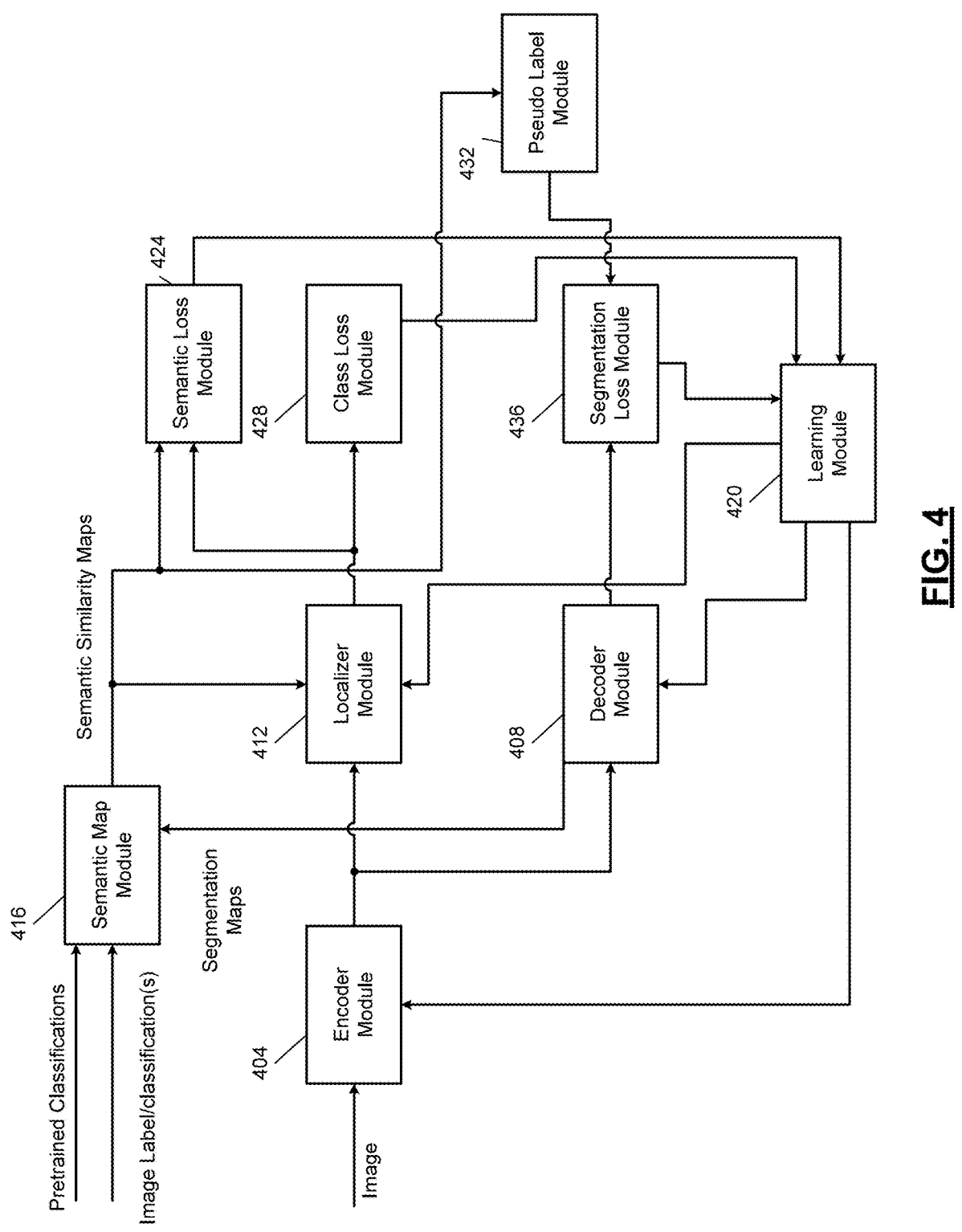
FIG. 4 is a functional block diagram of an example implementation of a semantic segmentation module.

FIG. 3 is a functional block diagram of an example training system. FIG. 4 is a functional block diagram including an example implementation of the semantic segmentation module 150. A training module 304 trains the semantic segmentation module 150 using a training dataset 308. Stated generally, the training module 304 first trains the semantic segmentation module 150 to perform semantic segmentation of objects in images of predetermined classes (labels). The training module 304 first trains the semantic segmentation module 150 using images including objects of the predetermined classes and pixel level annotations for the objects in the images. The pixel level annotations include pixels defining the outer boundaries of the objects in the images.

After the first training, the training module 304 second trains the semantic segmentation module 150 to semantically segment other types of objects having new classes other than the predetermined classes. The training module 304 performs the second training using images and image level labels (and not including pixel level annotations) based on semantic similarity between the labels of the images and the predetermined classes.

Generally speaking, the present application provides systems and methods for weakly supervised class incremental semantic image segmentation (WSCIS). The semantic segmentation module 150 is configured to incrementally learn to segment instances from new classes (other than the predetermined classes of the first training) using only images with image level labels (and not including pixel level annotations). In this manner, the semantic segmentation module 150 need not later be trained using pixel level annotations for images to be able to segment objects belonging to new classes not used during the initial training.

Let $$\mathcal{D}^b = \{(x_k^b, y_k^b)\}_{k=1}^{N^b}$$

be the training dataset for the semantic image segmentation (SIS) where $x^b \in \mathbb{R}^{H \times W_x}$ represents an input image and $y^b$ is a tensor including the $|C^b|$ dimensional one-shot label vectors for each pixel in a H×W dimension spatial grid corresponding to set of $C^b$ semantic classes (predetermined classes). Objects that do not belong to any of these predetermined classes are annotated as a special background class (bkg) included in $C^b$. Training based on $\mathcal{D}^b$ is considered a first (base) task and may include a suitable cardinality.

The training module 304 trains the semantic segmentation module 150 using $\mathcal{D}^b$. The semantic segmentation module 150 includes an encoder module 404 $E^b$, a decoder module 408 $F^b$, and a localizer module 412. The encoder module 404 projects an input image to a feature space and generates a feature vector based on the input image. The decoder module 408 receives input in the feature space (e.g., the feature vector) and projects the input to the image space. The localizer module 412 performs as described herein and identifies areas of the input image and their corresponding semantic class.

The training module 304 may first train the encoder module 404 and the decoder module 408 and leave the localizer module 412 fixed during the training of the encoder module 404 and the decoder module 408. The first segmentation model (including the encoder module 404 and the decoder module 408) can be described by:

$$(E^b \circ F^b): x \to \mathbb{R}^{\mathcal{J} \times C^b}$$

where $\mathcal{J} = H' \times W'$ is a spatial grid of an image corresponding to the input image size or a resized version of the input image and $(E^b \circ F^b)(x)$ is a set of class prediction maps where $$p_i^c$$

is the probability of the spatial location of $i = \mathcal{J}$ in the input image x belonging to the class c.

After the first (base) training, the semantic segmentation module 150 undergoes a sequence of learning steps with a learning module 420 as learning sets for new tasks (images having different classes than the predetermined classes) are received. New tasks may be received, for example, in response to user input during operation of the robot. For example, the semantic segmentation module 150 may be first trained based on images including cats and objects of other labels, but not based on images including sheep. When the robot encounters a sheep and captures an image including a sheep during operation, a user may input the class "sheep". The image including the sheep may then be used to learn how to segment sheep in images based on the semantic similarity between the label for the class cat and the label for the class sheep. User input (e.g., a word) identifying the class sheep of the image captured by the robot of a sheep may be spoken or input via one or more input devices, such as a keyboard, which may be a touchscreen or physical keyboard.

At each learning step t, the learning module 420 inputs to the semantic segmentation module 150 is exposed to a new dataset $$\mathcal{D}^t = \{(x_k^t, l_k^t)\}_{k=1}^{N^t}$$

including $N^t$ instances labeled for $C^t$ classes not included in the predetermined classes where $l^t \in \mathbb{R}^{C^t}|$ is a vector representation of an image level (not pixel level) label corresponding to an object in the image. In each incremental learning step, only an image level label (a weak annotation) is provided for the new class. This is in contrast with the initial training where the training module 304 trained the semantic segmentation module 150 using pixel level annotations. This portion updates the semantic segmentation module 150 at each incremental step t in a weakly supervised way without the semantic segmentation module 150 forgetting how to segment objects of the predetermined classes. The semantic segmentation module 150 learns the function:

$$(E^t \circ F^t): x \to \mathbb{R}^{\mathcal{J} \times |Y^t|}$$

where $$Y^t = \bigcup_{k=1}^t \{C^k\} \cup C^b$$

is the set of labels at step t including both the predetermined classes (labels/names) and the new classes. The data used to learn during the previous tasks may not be stored in memory meaning that there is no episodic memory for the semantic segmentation module 150 to return to.

The learning module 420 leverages the semantic relationships between a new class to be learned and the predetermined (old) classes. Semantic object categories may not be independent meaning that the new classes $C^t$ that are being learned at step t may bear semantic resemblance with one or more of the predetermined classes from $Y^{t-1}$ seen by the semantic segmentation module 150 during previous training. For example, the training module 304 may first train the semantic segmentation module 150 to segment instances of the "cow" class (and not the "sheep" class) with dense supervision during the first training. At a step t, the semantic segmentation module 150 can be tasked with learning to segment the "sheep" class using the image-level label "sheep" and one or more images that include a sheep. Since cows and sheep are closely related species sharing similar attributes (e.g., both are four legged furry mammals), the previous configurations of the encoder module 404 and the decoder module 408 of $(E^{t-1} \circ F^{t-1})$ or $((E \circ F)^{t-1})$ provide valuable clues to localize the regions of the image including sheep despite never having seen an image including a sheep before. These regions can be segmented by the previous model $((E \circ F)^{t-1})$, that in this case will classify them as belonging to "cow" instead of "sheep". The semantic segmentation module 150, however, learns using a semantic based prior that uses predictions from the previously trained semantic segmentation module $(E^{t-1} \circ F^{t-1})$ or $((E \circ F)^{t-1})$ to discover more precise object boundaries (and therefore better segmentation maps) for the new classes.

At step t, using the configuration of $((E \circ F)^{t-1})$, for each pixel $$x_i^t,$$

a semantic map module 416 assigns the most probable class label $$y_i^* = \arg\max_{c \in Y^{t-1}} \hat{y}_i^c$$

from the predetermined classes generating a label map y*. Given the set of ground truth image level labels $$\mathcal{L}(x^t) = \{c \mid l_c^t = 1\}$$

associated with image $x^t$, the semantic map module 416 generates a similarity map $s^c$ between each class $l^c$ in $\mathcal{L}(x^t)$ and the predicted label map y*, such as follows:

$$s^c = S_\Omega(w(y_i^*), w(l^c)))_{i \in \mathcal{J}}$$

where w(c) is a vectoral embedding of the semantic class c in the semantic embedding space $\Omega$ and $S_\Omega$ is a semantic similarity measure defined between the labels of classes in $\Omega$.

In various implementations for computing semantic similarity measures between class labels made up of words, the semantic embedding that may be applied by the semantic map module 416 may be the Word2Vec semantic embedding, the GloVe semantic embedding, or the bidirectional encoder representations from transformers (BERT) semantic embedding, or another suitable type of semantic embedding. The Word2Vec semantic embedding is described in Mikolov et al., Efficient Estimation of Word Representations in Vector Space, arXiv:1301.3781, 2013, which is incorporated herein in its entirety. The GloVe semantic embedding is described in Pennington et al., Glove: Global vectors for word representations, in EMNLP, 2013, which is incorporated herein in its entirety. The BERT semantic embedding is described in Devlin et al., BERT: Pre-training of Deep Bidirectional Transformers for Language Understanding, in NAACL HLT, 2019, which is incorporated herein in its entirety.

Figure 5:
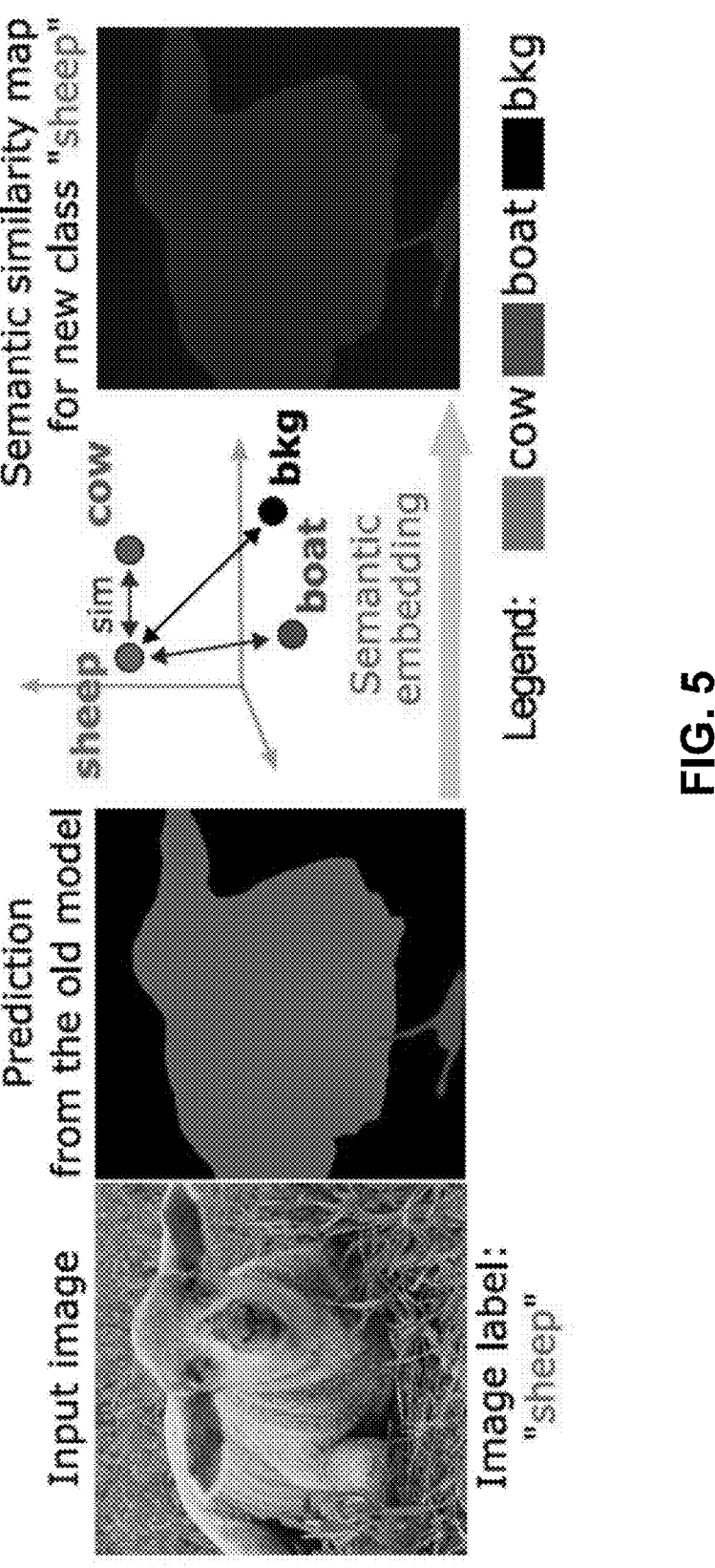
FIG. 5 includes example images of an input image, a segmentation from the semantic segmentation module without the training/learning described herein, a semantic similarity illustration, and a semantic similarity map for a new class learned by the semantic segmentation module.

The semantic embedding may be configured such that the dot product between the embedding vectors S n reflects the semantic similarity between words that represent semantic classes. For example, in FIG. 5, $S_\Omega$(w(sheep),w(cow))>>$S_\Omega$ (w(sheep),w(bkg)) as the word sheep lies closer to the word cow in the semantic space then bkg (the word background). FIG. 5 includes example images of an input image, a segmentation from the semantic segmentation module 150 without the training/learning described herein, a semantic similarity illustration, and a semantic similarity map for a new sheep class learned by the semantic segmentation module 150.

The semantic segmentation module 150 learns based on the boundaries of objects having semantically similar classes. The background class may play an important role. To ensure not to alter the original predictions made on the background (bkg) class, the semantic map module 416 may normalize the similarity map such that the score for the background class to be equal to 1, such as using the equation:

$$s_i^c = \frac{\exp\left(\frac{s_\Omega(w(y_i^*), w(l^c))}{\tau}\right)}{\exp\left(\frac{s_\Omega(w(bkg), w(l^c))}{\tau}\right)},$$

where $\tau$ is a scaling hyperparameter. Using the similarity maps, the semantic segmentation module 150 converts the image labels $l^c$ into pixel level label maps $s^c$. Example similarity maps are illustrated in FIG. 5 and FIG. 6 using a three dimensional plot.

Figure 6:
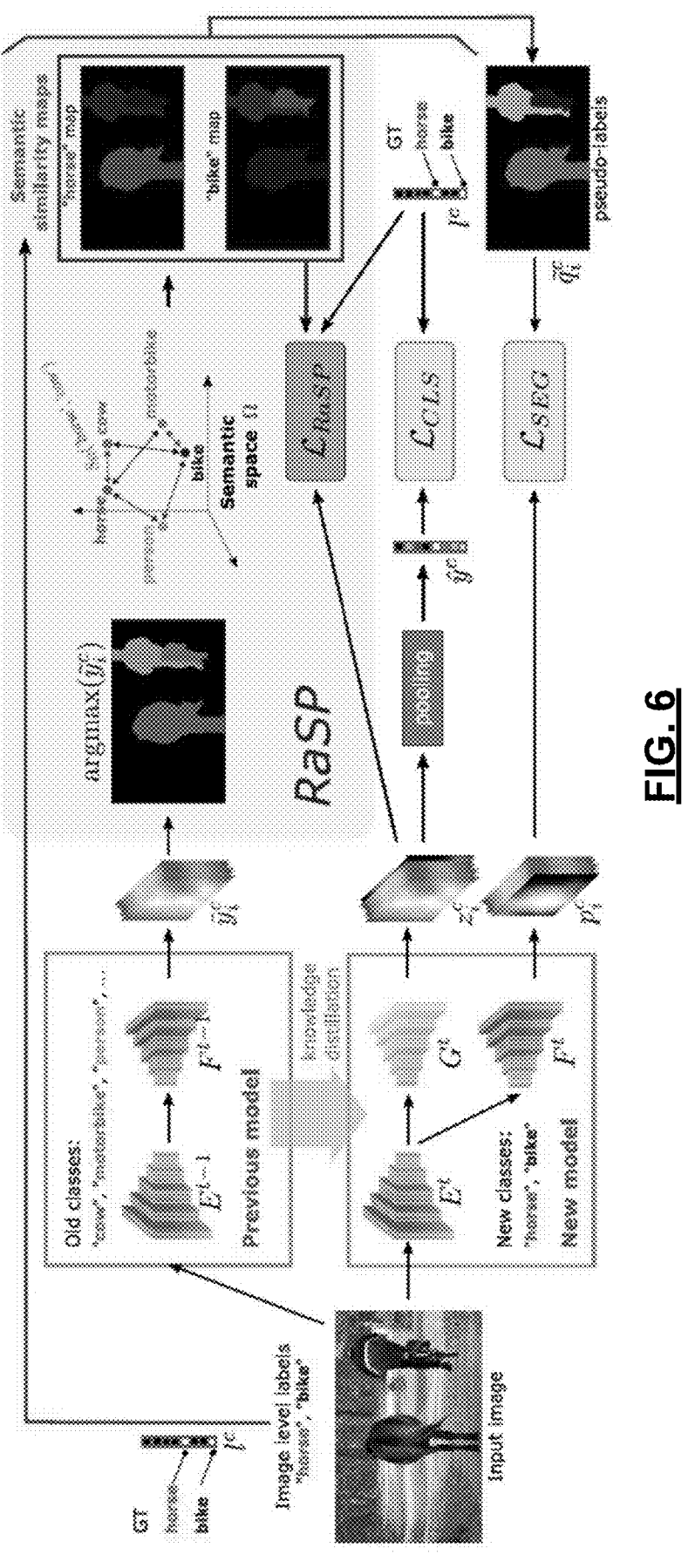
FIG. 6 includes an illustration including the functional block diagram of FIG. 4.

FIG. 6 includes an illustration including the functional block diagram of FIG. 4. FIG. 6 illustrates that at training/learning step t, the previous model $(E \circ F)^{t-1}$ has been trained to segment cows, motorbikes, and people as well as other classes. When an image is received including a bicycle (bike) and a horse, there are two new classes to learn. The previous model $(E \circ F)^{t-1}$ successfully segments the bicycle and the horse, but classifies the pixels including the bicycle as a motorbike and classifies the pixels including the horse as a cow, since these are the classes that the model has learned which are most similar to the new classes. Based on the semantic relationships between the words representing the old and new class names and the segmentation maps from the decoder module 408, the segmentation map module 416 determines semantic similarity maps for the new classes, and the pseudo-label module produces the pseudo-labels based on the semantic similarity maps. This converts the image level annotations of the new classes to pixel level (pseudo) labels for the new classes.

The normalization equation above could be used to improve the learning of new classes (not included in the predetermined classes) based on the semantic similarity maps. However, the learning module 420 adjusts the semantic segmentation module 150 to learn new classes that are dissimilar to the predetermined classes of the first training.

The training module 304 trains the localizer module 412 during the first training using in a supervised manner. The localizer module 412 selects regions of images for each semantic class. In various implementations, the localizer module 412 may determine class activation maps (CAMs) which produce discriminative regions for each class that are then used by the localizer module 412 to determine pixel level annotations.

The localizer module 412 may perform label propagation or conditional random fields (CRFs). The localizer module 412 uses the semantic similarity maps as a supervisory signal.

A relationship aware semantic prior (RaSP) loss may be defined using the equation:

$$\mathcal{L}_{RaSP} =$$

$$-\frac{1}{|C^t||\mathcal{J}|}\sum_{i\in\mathcal{J}}\sum_{c\in C^t}\sigma(s_i^c)\log(\sigma(z_i^c)) + (1-\sigma(s_i^c))\log(1-\sigma(z_i^c)),$$

where $$z_i^c$$

is a value assigned by the localizer module 412 for class c at pixel l, and $\sigma$ is the sigmoid function. A semantic loss module 424 may determine the RaSP loss. A total loss $\mathcal{L}$ may be determined by the learning module 420 based on a mathematical sum (+) of the RaSP loss and a class loss ( $\mathcal{L}_{CLS}$ ).

The RaSP loss serves as a regularizer that encourages forward transfer from the predetermined classes to new classes to be learned. The RaSP loss is based on semantic relationships between the predetermined classes and new classes to be learned.

The encoder module 404, the decoder module 408, and the localizer module 412 may have the architecture described in Cermelli, et al., Incremental Learning in Semantic Segmentation from Image Labels, In CVPR, 2022, which is incorporated herein in its entirety. The learning module 420, however, may train the localizer module 412 based on the RaSP loss, such as to minimize the RaSP loss.

Explained in more detail, at time step t, included may be a shared encoder $E^t$ and a segmentation head (decoder) $F^t$ that are both incrementally updated by the learning module 420 and the localizer module 412 that is trained from scratch (predetermined default values) for each new task. Also stored is a copy of the semantic segmentation module 150 after the previous task $(E\circ F)^{t-1}$.

Given an image for the task to be learned, $$\hat{y} = \sigma\big((E\circ F)^{t-1}(x)\big) \in \mathbb{R}^{\mathcal{J}\times|\mathcal{Y}^{(t-1)}|}$$

is the output generated by the copy of the semantic segmentation module 150 after the previous task. The localizer module 412 determines score values $z=(G\circ F)^t(x))\in \mathbb{R}^{x\times|\mathcal{Y}^t|}$ and aggregates the scores into a one dimensional vector $\hat{y}= \mathbb{R}^{|\mathcal{Y}^t|}$. Each per class aggregated score $\hat{y}_c$ is determined by the localizer module 412 using a global weighted pooling combined with a focal penalty term. This allows the learning using image level labels using a multi-label soft margin loss, the class loss $\mathcal{L}_{CLS}$. The class loss may be determined by a classes loss module 428 using the equation:

$$\mathcal{L}_{CLS} = (\hat{y}, 1) = -\frac{1}{|C^t|}\sum_{c\in C^t} l^c\log(\sigma(\hat{y}^c)) + \sum_{c\in C^t}(1-l^c)\log(1-\sigma(\hat{y}^c))$$

While the localizer module 412 outputs a $Y^t$ dimensional vector, at learning task t, only used is image level annotations for the new class to be learned. The sum in the above equation is therefore only computed over the new classes.

For the learning/training of the localizer module 412, a normalized global weighted pooling may be used where the channel-wise scores z are aggregated into a one dimensional output vector $\hat{y}_{nGWP}\in \mathbb{R}^{|\mathcal{Y}^t|}$ that may be determined using the equation:

$$y_{nGWP}^c = \frac{\sum_{i\in\mathcal{J}}m_i^c z_i^c}{\epsilon + \sum_{i\in\mathcal{X}}m_i^c},$$

where m=softmax(z) and $\in$ is a predetermined value set to prevent division by zero. Regarding penalization, to penalize the localizer module 412 from predicting small object masks, a penalty term may be added, such as $$y_{FOC}^c = \left(1 - \frac{\sum_{i\in\mathcal{X}}m_i^c}{|\mathcal{X}|}\right)^{\gamma}\log\left(\lambda - \frac{\sum_{i\in\mathcal{X}}m_i^c}{|\mathcal{X}|}\right)$$

where $\gamma$ and $\lambda$ are hyperparameters and predetermined values. The localizer module 412 may determine the scores by summing the scores from the previous two equations.

A pseudo label module 432 determines pseudo supervision scores $\tilde{q}_c$ based upon which the learning module 420 updates one or more parameters of the encoder module 404 and/or the decoder module 408 $(E\circ F)^T$, such as based on minimizing a segmentation loss. A segmentation loss module 436 may determine the segmentation loss $\mathcal{L}_{Seg}$ based on the pseudo supervision scores, such as using the equation:

$$\mathcal{L}_{Seg}(\hat{p}, \tilde{q}) =$$

$$-\frac{1}{|Y^t||\mathcal{J}|}\sum_{i\in\mathcal{X}}\sum_{c\in Y^t}\tilde{q}_i^c\sigma(s_i^c)\log(\sigma(p_i^c)) + (1-\tilde{q}_i^c)\log(1-\sigma(p_i^c)),$$

where $\hat{p}=(E\circ F)^T(x)$ are the predictions from the segmentation head and $\tilde{q}$ is a supervisory signal including (i) the old model's predictions from the predetermined classes, (ii) the localizer module 412's scores for the new classes, and (iii) a minimum between the predictions for the old model and the localizer module 412 scores for the background class. The learning module 420 may adjust one or more parameters of the semantic segmentation module 150 (e.g., the encoder module 404, the decoder module 408, and/or the localizer module 412) based on a sum (e.g., a non-weighted sum) based on or including the class loss and the segmentation loss.

Figure 7:
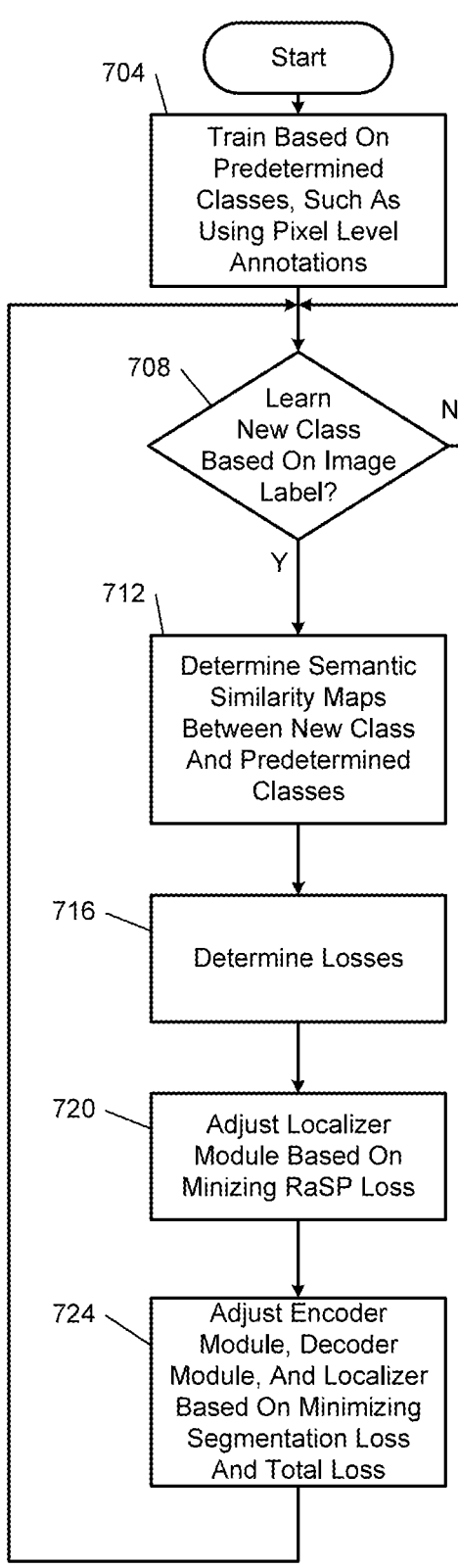
FIG. 7 is a flowchart depicting an example method of training the semantic segmentation module and learning to semantically segment new classes of objects not seen during the training.

FIG. 7 is a flowchart depicting an example method of training the semantic segmentation module 150 and learning to semantically segment new classes of objects not seen during the training. Control begins with 704 where the training module 304 trains the semantic segmentation module 150 to semantically segment objects of the predetermined (base) classes using images and, for example, pixel level annotations of objects in the predetermined classes. The pixel level annotations include boundaries of the objects in the images. While the example of training using pixel level annotations is provided, the present application is also applicable to training for the base classes being performed in another suitable manner.

At 708, the semantic segmentation module 150 determines whether input has been received including a set of images with image level labels (and not including pixel level annotations) to learn a new class of object that is not included in the predetermined classes upon which the semantic segmentation module 150 was previously trained. In an example, image level label of the set of images including a textual label (with one or more words) that defines the new class. If true, control continues with 712. If false, control remains at 708.

At 712, the semantic map module 416 determines the semantic similarity maps based on semantic similarity between the words representing the new class to learn and the predetermined classes, respectively.

At 716, the semantic loss module 424, the class loss module 428, and the segmentation loss module 436 determine the losses, as described above. As described above, the semantic loss module 424 determines the RaSP loss based on the semantic similarity maps between the new class of object to be learned and the predetermined classes upon which the semantic segmentation module 150 was previously trained. The segmentation loss module 436 determines the segmentation loss based on the pseudo label scores and as discussed above.

At 720, before 724, the learning module 420 selectively adjusts one or more parameters of the localizer module 412 based on the RaSP loss, such as based on minimizing the RaSP loss. At 724, the learning module 420 selectively adjusts one or more parameters of at least one of the encoder module 404, the decoder module 408, and the localizer module 412 based on the RaSP loss, such as based on minimizing the segmentation loss. The learning module 420 may also selectively adjust one or more parameters of at least one of the encoder module 404, the decoder module 408, and the localizer module 412 based on the RaSP loss, such as based on minimizing the total loss. Via 712-724, the semantic segmentation module 150 learns to semantically segment objects having the new class in images based on the semantic similarity between the new class and the predetermined classes upon which the semantic segmentation module 150 was initially trained. While the example of returning to 708 is provided, 712-724 may be performed one or more times before returning to 708.

Figure 8:
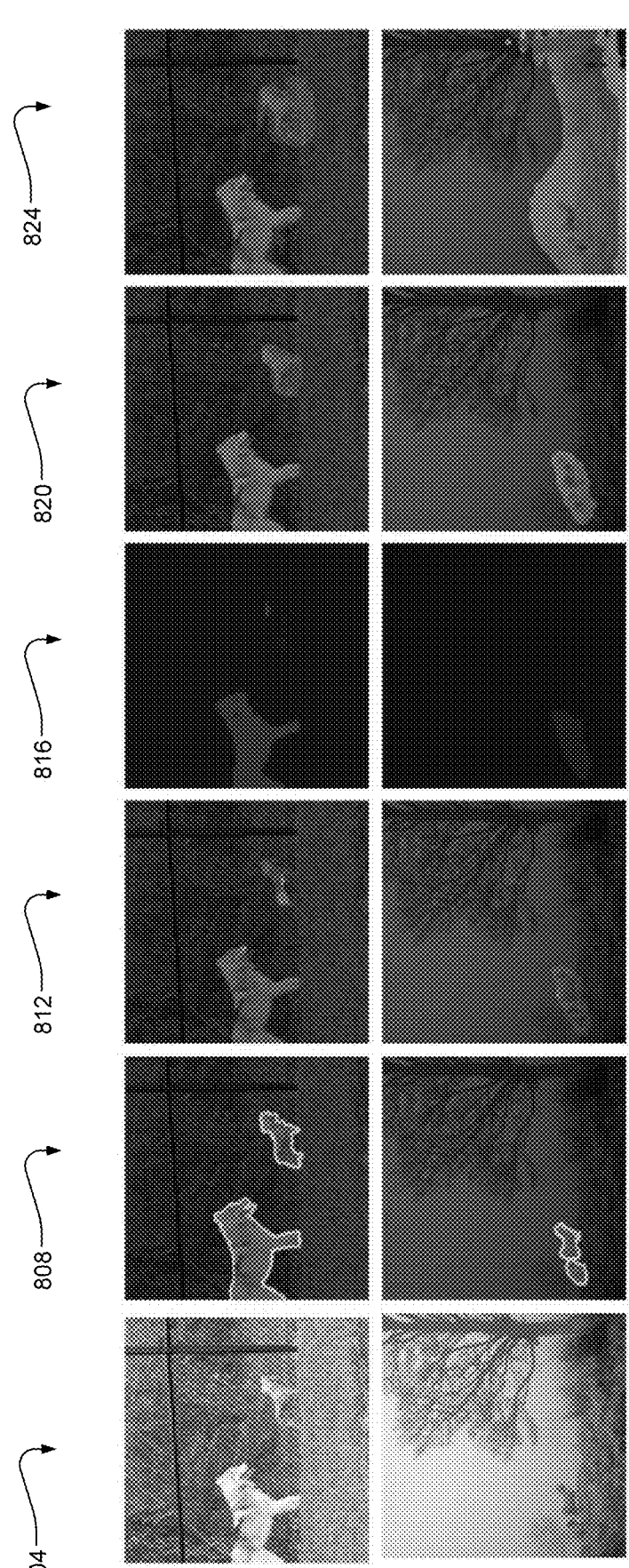
FIG. 8 includes example images illustrating various features described herein.

FIG. 8 includes example images illustrating various features described herein. The top row is for the class dog when the semantic segmentation module 150 was not previously trained for the dog class. The bottom row is for the class sheep when the semantic segmentation module 150 was not previously trained for the sheep class.

The left most column 804 illustrates input images for learning the new classes of dog (top row) and sheep (bottom row). The label of the class dog would be provided (and not pixel level annotations) for learning of the dog class, and the label of the class sheep would be provided (and not pixel level annotations) for learning of the sheep class.

Column 808 illustrates ground truth segmentations of the objects for reference (not used for training). Column 812 illustrates example segmentations generated by the semantic segmentation module 150 with the training based on the (predetermined) classes learned before this particular training stages and before learning to segment the dog (first row) and sheep (second row) classes.

Column 816 illustrates example semantic similarity maps generated for the input images. Column 820 illustrates segmentations of the dog and sheep class by the semantic segmentation module 150 after the training/learning described herein. Column 824 illustrates segmentations of the dog and sheep class by another segmentation module trained without using the RaSP loss. As illustrated by columns 820 and 824, training/learning based on the RaSP loss as described herein enables more accurate segmentation of the classes upon which the semantic segmentation module 150 was not previously trained.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A semantic image segmentation (SIS) system, comprising:

a semantic segmentation module trained to segment objects belonging to predetermined classes in input images using training images;

a learning module configured to selectively update at least one parameter of each of a localizer module, an encoder module, and a decoder module of the semantic segmentation module to identify objects having a new class that is not one of the predetermined classes:

based on an image level class for a learning image including an object having the new class that is not one of the predetermined classes; and without a pixel-level annotation for the learning image; and a semantic map module configured to determine semantic similarity measures between the new class and the predetermined classes, respectively, wherein the learning module is configured to selectively update at least one parameter of the localizer module of the semantic segmentation module based on the at least one of the determined semantic similarity measures.

2. The SIS system of claim 1 wherein the semantic map module is configured to generate semantic similarity maps based on the determined semantic similarity measure between the new class and the predetermined classes, respectively, wherein the learning module is configured to selectively update at least one parameter of the localizer module of the semantic segmentation module based on the semantic similarity maps.

3. The SIS system of claim 2 further comprising a semantic loss module configured to determine a loss based on the semantic similarity maps, wherein the learning module is configured to selectively update at least one parameter of the localizer module of the semantic segmentation module based on the loss.

4. The SIS system of claim 3 wherein the learning module is configured to selectively update at least one parameter of the localizer module of the semantic segmentation module based on minimizing the loss.

5. The SIS system of claim 1 wherein the semantic segmentation module is trained to segment objects belonging to the predetermined classes in input images using training images and pixel-level annotations for training images including objects having the predetermined classes, the pixel-level annotations including pixels defining boundaries of the objects in the training images.

6. The SIS system of claim 1 wherein the learning module is configured to update a classifier layer of the decoder module of the semantic segmentation module.

7. The SIS system of claim 1 further comprising a segmentation loss module configured to determine a loss, wherein the learning module is configured to selectively update the at least one parameter of at least one of (a) the encoder module of the semantic segmentation module, (b) the decoder module of the semantic segmentation module, and (c) the localizer module based on the loss.

8. The SIS system of claim 7 wherein the learning module is configured to selectively update the at least one parameter of at least one of (a) the encoder module of the semantic segmentation module, (b) the decoder module of the semantic segmentation module, and (c) the localizer module based on minimizing the loss.

9. The SIS system of claim 1 wherein the one of the predetermined classes is a background class corresponding to background behind objects.

10. A robot comprising:
a camera;
the semantic image segmentation system of claim 1; and
a control module configured to actuate an actuator of the robot based on an object segmented from an image from the camera by the semantic segmentation module.

11. The SIS system of claim 1 wherein the new class includes a word descriptive of the object in the learning image.

12. The SIS system of claim 1 wherein the learning module is further configured to selectively update at least one parameter of each of the localizer module, the encoder module, and the decoder module of the semantic segmentation module to identify objects having a second new class that is not the new class and not one of the predetermined classes:
based on a second image level class for a second learning image including a second object having the second new class that is not one of the predetermined classes and not the new class; and
without a pixel-level annotation for the second learning image.

13. A semantic image segmentation (SIS) system, comprising:
a semantic segmentation module including a semantic segmentation model that receives a first training using a first set of training images with pixel-level annotations labeled with one or more predetermined classes, the semantic segmentation module configured to segment objects in an input image using the semantic segmentation model into one or more of the predetermined classes; and
a learning module configured to selectively update at least one parameter of the semantic segmentation model using a second set of training images with image-level annotations and without pixel-level annotations, the semantic segmentation model receiving a second training from the learning module to identify objects of a first new class that is not one of the predetermined classes using semantic similarity measures determined between labels identifying the first new class and labels identifying the predetermined classes, respectively,
wherein the semantic segmentation module is configured to segment objects in the input image into one or more of the predetermined classes and the first new class once the segmentation model is second trained by the learning module for the first new class.

14. The SIS system of claim 13 wherein:
the learning module is configured to selectively update at least one parameter of the semantic segmentation model using a third set of training images with image-level annotations without pixel-level annotations;
the semantic segmentation model receives a third training from the learning module to identify objects of a second new class that is not one of the predetermined classes or the first new class using semantic similarity measures determined between labels identifying the second new class and labels identifying the predetermined classes and the first new class, respectively; and
the semantic segmentation module segments objects in the input image into one or more of the predetermined classes, the first new class, and the second new class once the segmentation model is trained by the learning module for the second new class.

15. A semantic image segmentation (SIS) system, comprising:
memory storing a semantic segmentation model trained using (a) a first set of training images with pixel-level annotations labeled for a first set of classes before being trained with (b) a second set of training images and image-level annotations without pixel-level annotations labeled with a first new class not in the first set of classes using semantic similarity measures determined between labels identifying the first new class and labels identifying the first set of classes, respectively; and
a semantic segmentation module configured to, after the training, segment objects in an input image into the first set of classes and the first new class using the semantic segmentation model.

16. A semantic image segmentation (SIS) method, comprising:
obtaining a semantic segmentation module trained to segment objects belonging to predetermined classes in input images using training images;
selectively updating at least one parameter of each of a localizer module, an encoder module, and a decoder module of the semantic segmentation module to identify objects having a new class that is not one of the predetermined classes:
based on an image level class for a learning image including an object having the new class that is not one of the predetermined classes; and
without a pixel-level annotation for the learning image; and
determining semantic similarity measures between the new class and the predetermined classes, respectively,
wherein the selectively updating includes selectively updating at least one parameter of the localizer module of the semantic segmentation module based on the determined semantic similarity measures.

17. The SIS method of claim 16 further comprising:
generating semantic similarity maps based on the determined semantic similarity measure between the new class and the predetermined classes, respectively, wherein the selectively updating includes selectively updating at least one parameter of the localizer module of the semantic segmentation module based on the semantic similarity maps.

18. The SIS method of claim 17 further comprising determining a loss based on the semantic similarity maps, wherein the selectively updating includes selectively updating at least one parameter of the localizer module of the semantic segmentation module based on the loss.

19. The SIS method of claim 18 wherein the selectively updating includes selectively updating at least one parameter of the localizer module of the semantic segmentation module based on minimizing the loss.

20. The SIS method of claim 16 wherein the semantic segmentation module is trained to segment objects belonging to the predetermined classes in input images using training images and pixel-level annotations for training images including objects having the predetermined classes, the pixel-level annotations including pixels defining boundaries of the objects in the training images.

21. The SIS method of claim 16 wherein the selectively updating includes updating a classifier layer of the decoder module of the semantic segmentation module.

22. A semantic image segmentation (SIS) system, comprising:

a semantic segmentation module trained to segment objects belonging to predetermined classes in input images using training images;

a learning module configured to selectively update at least one parameter of each of a localizer module, an encoder module, and a decoder module of the semantic segmentation module to identify objects having a new class that is not one of the predetermined classes:

based on an image level class for a learning image including an object having the new class that is not one of the predetermined classes; and without a pixel-level annotation for the learning image, wherein the learning module is configured to update a classifier layer of the decoder module of the semantic segmentation module.

* * * * *